(12) United States Patent
Pilu et al.

(10) Patent No.: US 7,302,113 B2
(45) Date of Patent: Nov. 27, 2007

(54) DISPLAYING DIGITAL IMAGES

(75) Inventors: Maurizio Pilu, Bristol (GB); David Arthur Grosvenor, Bristol (GB); Shane Dickson, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 560 days.

(21) Appl. No.: 10/205,201

(22) Filed: Jul. 26, 2002

(65) Prior Publication Data

US 2003/0025810 A1    Feb. 6, 2003

(30) Foreign Application Priority Data

Jul. 31, 2001   (GB) ................... 0118669.1

(51) Int. Cl.
*G06K 9/36* (2006.01)
*G09G 5/00* (2006.01)

(52) U.S. Cl. .................. 382/276; 345/629; 345/646
(58) Field of Classification Search ............... 345/646, 345/629, 630, 634; 382/276, 282, 284, 294; 348/97, 59
See application file for complete search history.

(56) References Cited

U.S. PATENT DOCUMENTS

| | | | | |
|---|---|---|---|---|
| 5,353,391 A | * | 10/1994 | Cohen et al. ............... 345/619 |
| 5,359,712 A | * | 10/1994 | Cohen et al. ............... 715/723 |
| 5,491,778 A | * | 2/1996 | Gordon et al. ............... 345/640 |
| 5,640,522 A | * | 6/1997 | Warrin ....................... 715/732 |
| 5,726,717 A | * | 3/1998 | Peters et al. ............... 348/593 |
| 6,177,953 B1 | * | 1/2001 | Vachette et al. ............ 348/59 |
| 6,300,956 B1 | * | 10/2001 | Apodaca et al. ............ 345/619 |
| 6,362,850 B1 | * | 3/2002 | Alsing et al. ............... 348/239 |
| 6,396,500 B1 | * | 5/2002 | Qureshi et al. ............. 345/473 |
| 6,405,464 B1 | * | 6/2002 | Gulick et al. ............... 40/454 |
| 6,433,839 B1 | * | 8/2002 | Siefken ....................... 348/700 |
| 6,628,283 B1 | * | 9/2003 | Gardner ....................... 345/427 |

FOREIGN PATENT DOCUMENTS

| | | |
|---|---|---|
| EP | 0 961 230 A2 | 12/1999 |
| JP | 10-40421 | 2/1998 |
| JP | 11-136605 | 5/1999 |
| JP | 11-136605 A | 5/1999 |
| JP | 2000-29885 | 1/2000 |
| JP | 2001-331804 A | 11/2001 |

OTHER PUBLICATIONS

Miller et al., Nov. 1995, "A feature-based algorithm for detecting and classifying scene breaks" (pp. 1-25).*

* cited by examiner

*Primary Examiner*—Bhavesh M. Mehta
*Assistant Examiner*—Manav Seth (57) ABSTRACT

A method of displaying digital images comprises the steps of using a processor to determine an extent of similarity between a first image part and a second image part, displaying a first image part from a viewpoint and transitioning to displaying a second image part from a viewpoint, the second image part being selected at least partly based on a determined extent of similarity between the first image part and the second image part, in which the viewpoint of an image part is moved either during the transition or after the transition takes place. An appropriate system is provided.

36 Claims, 5 Drawing Sheets

DISPLAYING DIGITAL IMAGES

FIELD OF THE INVENTION

The present invention relates to methods of displaying digital images and to computer systems therefor.

BACKGROUND TO THE INVENTION

Static digital images can now be produced from a wide variety of sources, including digital cameras and scanners. The ease of production, and relative ease of storage, of such images means that there can be many of them available. This has led to the recognition of the growing problem of holding the viewers attention when viewing an image. In an attempt to address this problem, it has been proposed to use so-called "rostrum camera" techniques, which produce a series of images from a static image by zooming in on a part of the image, zooming out to the original image and then zooming in on a different part of the original image.

A method of automating rostrum camera techniques for static digital images has been proposed in our co-pending United Kingdom patent application number GB 0104589.7 the content of which is incorporated herein by reference. The method disclosed therein is used automatically to determine areas of interest in the image to avoid the requirement for a manual selection thereof by the user. It is concerned with viewing a single image by producing a moving sequence of images thereover. It can pan, zoom or fade between images, all of which are forms of moving viewpoints. This is referred to as a rostrum path, whether produced manually or automatically.

Figure 1:
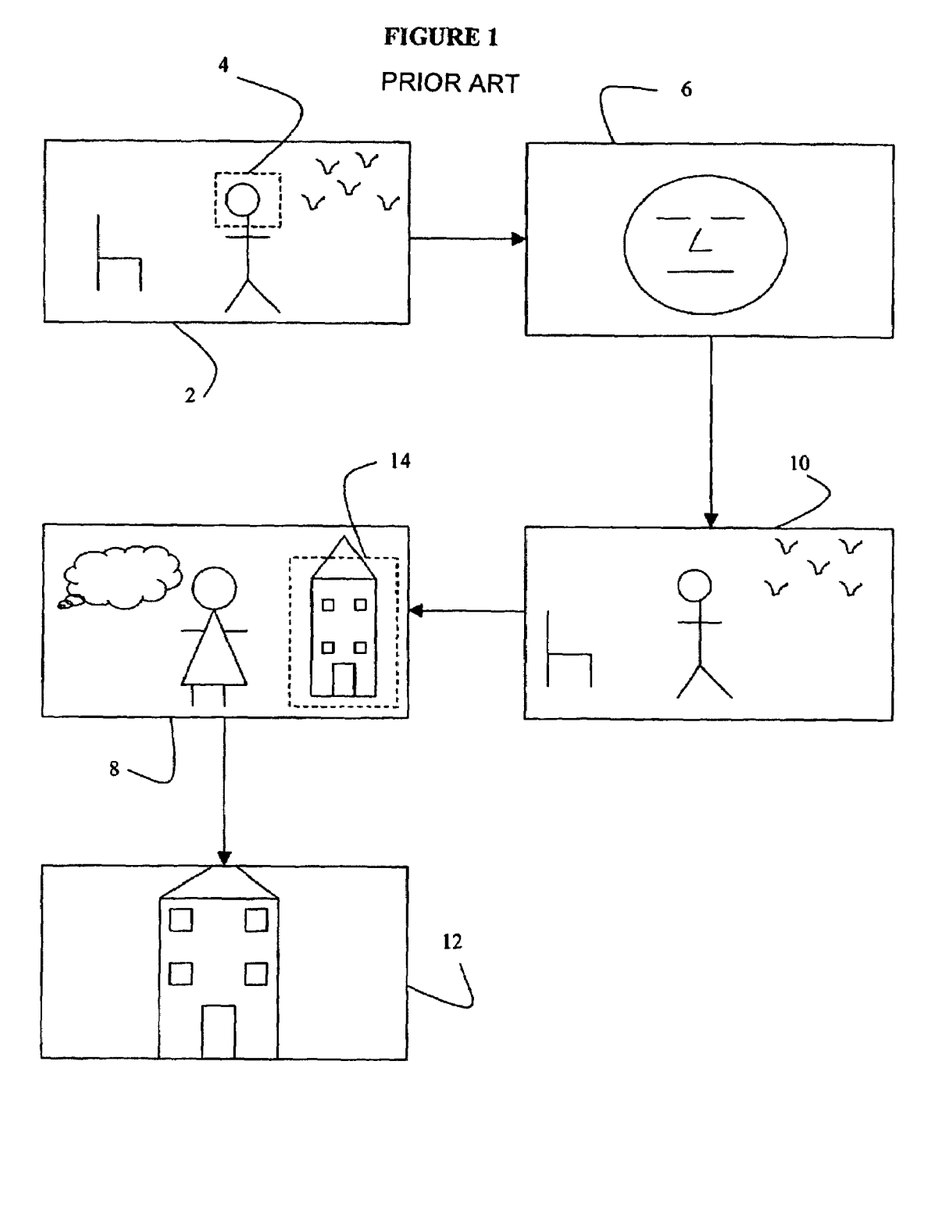
FIG. 1 is a diagrammatic illustration of the image transitions of a prior art rostrum camera method.

However, a viewer often wishes to view a plurality of separate digital images. In this case, as shown in FIG. 1 of the drawings that follow, from a first static digital image 2, an object 4 (here a person's face) is selected (whether manually or automatically) on which to zoom and a first zoomed image 6 is displayed by the system zooming in on the object 4. The zoomed image 6 thus shows a part (not being the whole) of the first static digital image 2. To move to a second static digital image 8, the method is first to zoom out from the first zoomed image 6 to first static digital image 2 (shown as 10 in FIG. 1 to illustrate the sequence though it is identical to image 2), to replace first static digital image 2 with second digital static image 8. The view may then zoom in to a part of the second static digital image 8 as a second zoomed image 12 on an object (house 14) selected manually or by an automatic process.

Such a transition between images can be arbitrary, aesthetically unappealing and slow. The transition from image 6 to image 12 is via two full-view images (8 and 10) and the two zoomed images are unconnected conceptually and visually.

SUMMARY OF THE INVENTION

According to the present invention in a first aspect, there is provided a method of displaying digital images comprising the steps of using a processor to determine an extent of similarity between a first image part and a second image part, displaying a first image part from a viewpoint and transitioning to displaying a second image part from a viewpoint, the second image part being selected at least partly based on a determined extent of similarity between the first image part and the second image part, in which the viewpoint of an image part is moved during the transition.

According to the present invention in a second aspect, there is provided a method of displaying digital images comprising the steps of using a processor to determine an extent of similarity between a first image part and a second image part, displaying a first image part from a viewpoint and transitioning to displaying a second image part from a viewpoint, the second image part being selected at least partly based on a determined extent of similarity between the first image part and the second image part, in which the viewpoint of the second image part is moved after the transition takes place.

Suitably, the transition is one or more of a dissolve, a wipe, a blind, a random dissolve or a morphing between images.

Suitably, the determination of an extent of similarity requires a substantial match between an object in a first image part and an object in a second image part before a transition is effected.

Suitably, an extent of similarity is determined between at least three image parts, which image parts are displayed in an order based at least in part on maximising the extent of similarity therebetween.

Suitably, a predetermined first image part is selected against which to determine an extent of similarity of a second image part.

Suitably, the predetermined first image part is the final image part of a rostrum path.

Suitably, the determination of the extent of similarity is uses image matching.

Suitably, a viewpoint is positioned to maximise the overlap between the first image part and the second image part.

Suitably, an extent of similarity is determined between faces in the first and second image parts.

Suitably, the first image part and the second image part each have a corresponding frame size and the respective frame size is determined to maximise the overlap between an object in the first image part and an object in the second image part.

Suitably, the first image part and second image part are from the same image.

Suitably, the first image part is from a first image and the second image part is from a second image.

Suitably, a rostrum path is determined in the first image having a first image part start and first image part finish.

Suitably, the first image part is the first image part finish.

Suitably, a rostrum path is determined in the second image having a second image part start and second image part finish.

Suitably, the second image part is the second image part start.

Suitably, the rostrum path of the first image and the rostrum path of the second image are determined whereby the first image part finish is the most similar image part determined in a comparison of the first image rostrum path and the second image rostrum path and the second image part start is the corresponding most similar image part of the second image.

Suitably, the or each rostrum path is determined using the processor to perform an analysis of image data from the first and second images to identify characteristics of the image content; and generating, in the processor, a set of video data for output to a display, the video data representing displayable motion over the image and being generated in accordance with the image content characteristics.

According to the present invention in a third aspect, there is provided a computer system comprising a processor, a data input port and a display device, the processor being arranged to receive image data from the data input port, and to determine an extent of similarity between a first image part of the image data and a second image part of the image data and to display a transition between a viewpoint of the first image part and a viewpoint of the second image part selected from a plurality of image parts, the selection being based at least partly on the determined extent of similarity between the first image part and the second image part, and in which the viewpoint of an image is moved during the transition.

According to the present invention in a fourth aspect, there is provided a computer system comprising a processor, a data input port and a display device, the processor being arranged to receive image data from the data input port, and to determine an extent of similarity between a first image part of the image data and a second image part of the image data and to display a transition between a viewpoint of the first image part and a viewpoint of the second image part selected from a plurality of image parts, the selection being based at least partly on the determined extent of similarity between the first image part and the second image part and in which the viewpoint of the second image part is moved after the transition takes place.

The view point is a 3-parameter quantity, namely x and y position and z zoom factor, relative to the image.

DESCRIPTION OF THE DRAWINGS

The present invention will now be described, by way of example only, with reference to the drawings that follow; in which.

DESCRIPTION OF PREFERRED EMBODIMENTS

Figure 2:
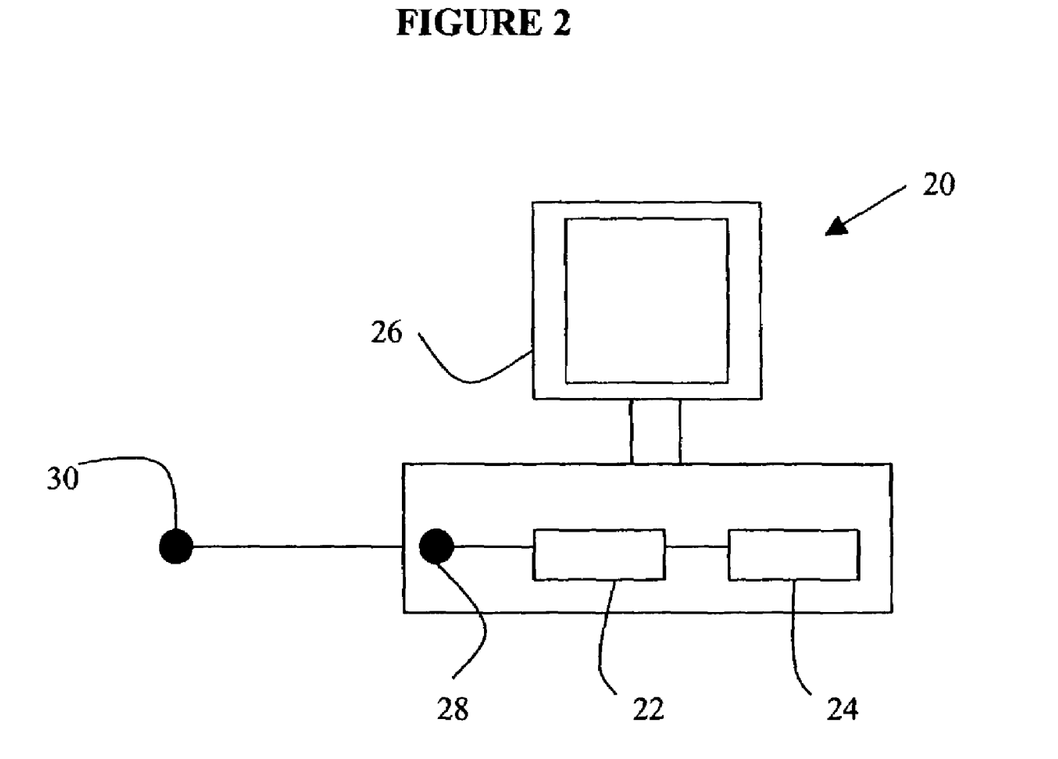
FIG. 2 is a schematic illustration of a computer system according to an embodiment of the present invention.

An embodiment of the present invention is shown in FIG. 2 of the drawings that follow. Referring to FIG. 1, a computer system 20 comprises a processor 22 connected to a memory 24, which processor 22 outputs data to a display device 26, such as a monitor. The computer system 20 further comprises a data input port 28 for receiving image data from a digital image data source 30, such as a scanner, digital camera, data carrier or an image download.

Memory 24 stores a computer program for operating the computer system 20 according to an embodiment of the present invention.

Figure 3:
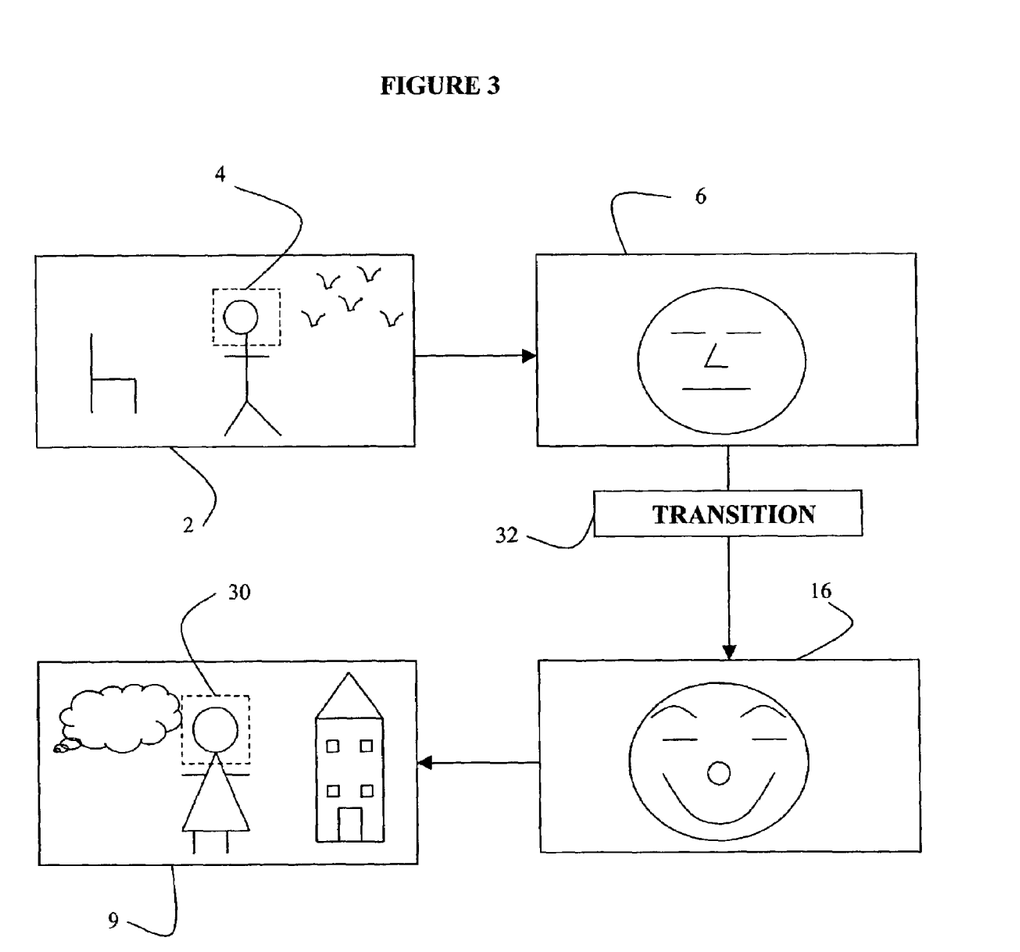
FIG. 3 is a diagrammatic illustration of image transitions of an embodiment of the present invention.
Figure 4:
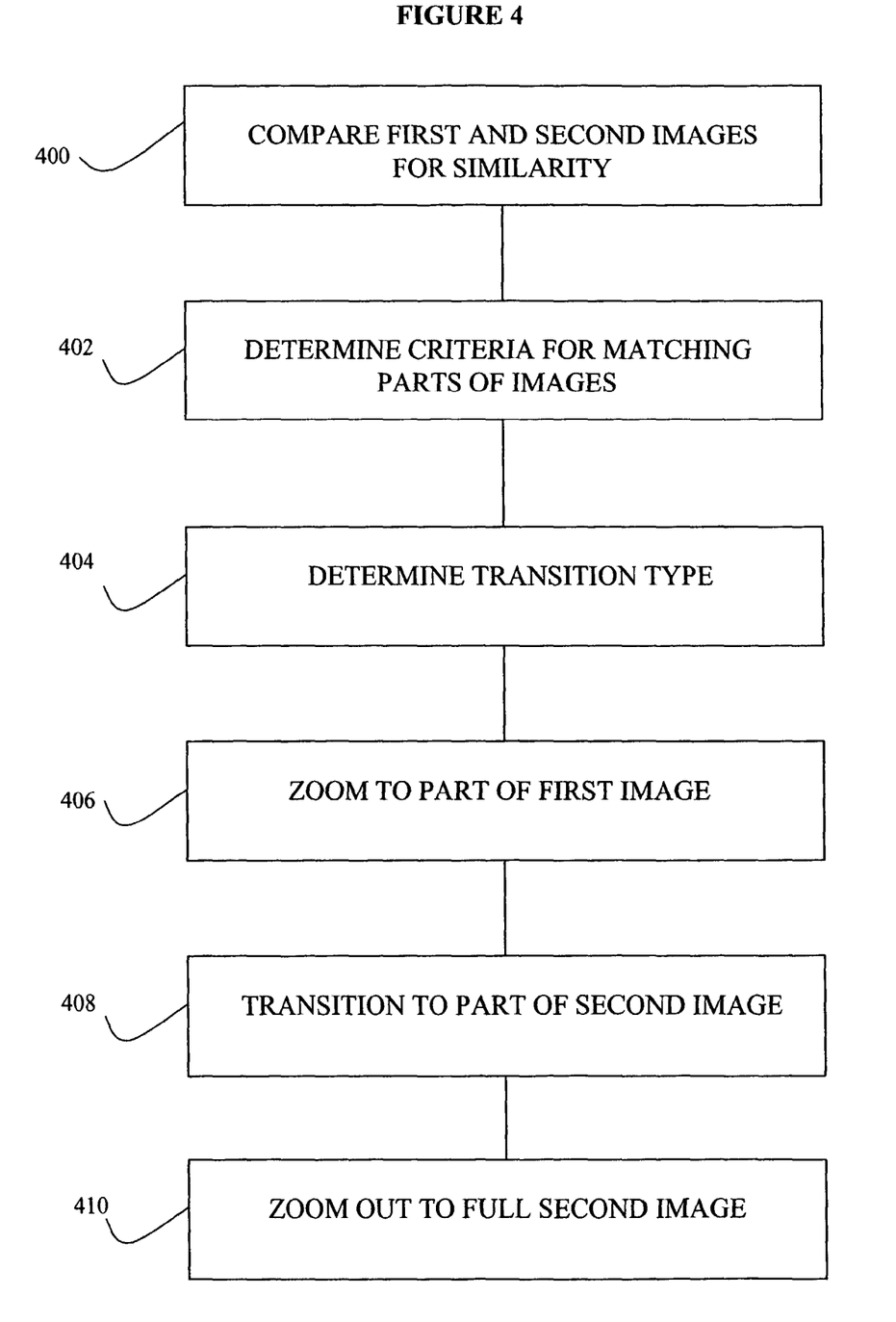
FIG. 4 is a functional flow diagram illustrating a method corresponding to FIG. 3.

Referring to FIGS. 3 and 4 of the drawings that follow, the method of this embodiment of the present invention is now described.

It is desired to transition from a first static digital image 2 (the same as the first image in FIG. 1) to a second static digital image 9 via a zoomed image of first static digital image 2. In order to do so, processor 22 determines the similarity of parts of first and second static digital images 2, 9 respectively (step 400 in FIG. 4). There are many different techniques for making an assessment of similarity (region matching) between parts of two images using machine-vision techniques. Generally these techniques use a combination of colour, texture and gradient information.

For instance general techniques used for image database indexing Rowley-Baluja-Kanade.. Neural Network based face detection. IEEE PAMI, 20(1):23-38 del Bimbo, A, Pala, P., Shape Indexing by Multi-Scale Representation, IVC Journal (17), No. 3/4 March 1999, pp. 243-259, Latecki, L. J. [L. Jan], Lak,,mper, R., Shape Similarity Measure Based on Correspondence of Visual Parts, PAMI(22), No. 10, October 2000, pp.1185 use region colour, shape and texture-based similarity metrics to find similar part of different images and could be uses to generate candidates for our purpose. If there are the same objects in two images other techniques can be used, such as active shape models [Cootes, T. F., Taylor, C. J., Lanitis, A., Multi-Resolution Search with Active Shape Models, ICPR Conference 1994 (vol App610-612) that seek to match similar shapes by deforming according to image characteristics. Faces are excellent candidate features for match-dissolving and techniques that locate faces and which can identify them as well Rowley-Baluja-Kanade. Neural Network based face detection. IEEE PAMI, 20(1):23-38, Brunelli, R., Falavigna, D., Person Identification Using Multiple Cues, IEEE PAMI(17), No. 10, October 1995, pp. 955-966 and can be used for extracting candidate face locations, matching scores etc.

In each case an assessment is made of the similarity between parts of the first static digital image 2 and parts of the second static digital image 10. From each technique a quantitative determination is made of the similarity of parts of image 2 with parts of image 8. The frame size of each image part may be selected manually or automatically and may be adaptively determined to maximise the overlap between objects in the respective images. This determination can be used in a number of ways, some of which are detailed below, to transition between the first static digital image 2 to the second static digital image 10.

It is noted that the "objects" may be single or multiple items and may be part or the whole of something. Any object may be a person, a face, a chair, a tree, a building, a part of scenery etc.

From each technique a quantitative determination is made of the similarity of parts of image 2 with parts of image 9.

The first option is for the transition to occur between the parts of the two images 2, 10 that have the highest quantitative determination of similarity.

Another option is for the transition to occur only for faces or even only if two individual faces are found that, according to the determination, belong to the same individual. Alternatively, after an initial determination of similarity, a weighting may be applied for items likely to be of interest (eg skin tones).

It may be pre-set that for the image transition according to embodiments of the present invention to occur, a given similarity threshold must be determined between at least a part of the first image and a part of the second image or identity may be required, though an allowance may be made for movement of an object between images.

Other possibilities exist. For instance a random selection may be made from any image part pair that exceed a predetermined similarity.

The determination of the object types the transition is to be between may be made automatically or manually (step 402 in FIG. 4).

A determination is then made (step 404 in FIG. 4) of the transition type to be used. Again, this can be an automatic or manual selection.

Many transitions can be used, including the following:
a) dissolve
b) wiping
c) blinds
d) random dissolve
e) morphing
f) cut Other possible transitions exist. These may be used singly or in combination.

The selection of which transition type to use can be made adaptively, in which case an automatic determination is made of the most appropriate transition to use, or randomly.

Referring again now to FIG. 3, it is determined in this example that the two most similar parts are the objects 4, 30 being the faces, of the individuals in the images 2, 9. The term "objects" is used in its widest sense. For instance it may include a mountain scene, a tree or even an arbitrary object such as a shape (see FIG. 5). The image then zooms to first zoomed image 6 (step 406 in FIG. 4). The view then transitions (indicated at 32) from the zoom on the object 4 on first image 2 to the zoomed image 30 of second image 9 (step 408 in FIG. 4), and may then zoom out to the full second image 9 (step 410 in FIG. 4). Thus, instead of transitioning between the images 2, 9 from full image to full image, the transition is from a zoomed image of one image to a zoomed image of another image.

In an alternative embodiment a selection of a part of first image 2 may be made before a determination of similarity is carried out. In such an embodiment a manual or automatic selection is made of a part of the first image of interest, say the face 4 in the first image 2 and then a determination of similarity is made between this image part and parts of the second image 9. Therefore the view may zoom to a part of the first image before any similarity determination is made.

It is preferable to position the viewpoint of both image parts so as to maximise the overlap therebetween. That is the veiwpoint is adjusted so that the position and dimensions of an object in the second image part match, to the maximum extent possible, the position and dimensions of the similarity based object in the first image part. So, if a face is determined as an object in the first image part and there is a face in the second image part to which a transition is to be made, if the first face is to the left and takes up half the image space, the viewpoint for the second image part is positioned so the second face is positioned correspondingly to the left and to take up substantially the same image area Embodiments of the present invention can, therefore, be used to produce slide shows from a plurality of static digital images.

Figure 5:
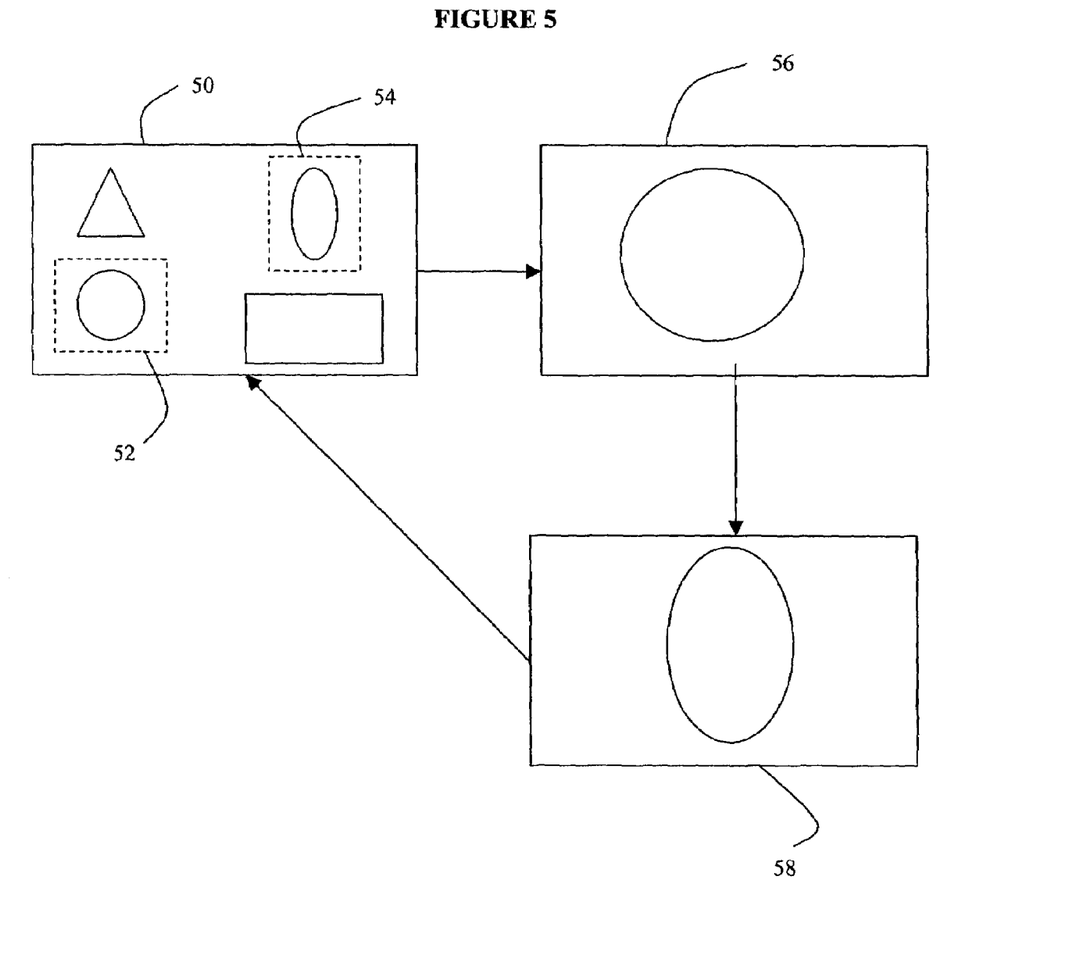
FIG. 5 is a diagrammatic illustration of image transitions of another embodiment of the present invention.

Referring to FIG. 5 of the drawings that follow, a further embodiment of the present invention is illustrated in which only a single original digital image 50 is analysed for similar image parts. In this case a sufficient similarity is found between first object 52 (a circle) and a second object 54 (an oval). Accordingly, a first zoomed image 56 of first object 52 is displayed, followed by a transition (as described above) to a second zoomed image 58 of second object 54. Optionally the displayed image may zoom out to the original image 50.

As with the FIGS. 3 and 4 embodiment, initial selection of an object/image part may be manual or automatic and a variety of part matches and transition types can be available.

The first and second image parts may be part of a rostrum path, in which case the rostrum path may be manually or automatically generated. A rostrum path extends for a plurality of image parts from an image part start to an image part finish. To create the best slide show, it is generally best if the final image of a first rostrum path is transitioned to the first image of a second rostrum path, the final and start images being determined as being the most similar.

Whether there is one image or two, a further refinement to the present invention is for three or more image parts to be assessed against each other for an assessment of similarity therebetween. The image parts can then be displayed in an order that has the lowest overall discrepancy between image parts.

If a first rostrum path has been determined, a transition to an image part, that may be the start image part of a second rostrum path, can be based on an assessment of similarity between the finish image part of the first rostrum path and part of the image which a transition is to be made, to maximise the similarity therebetween. In this case the first image part is fixed and the system and method seek a best matching second image part that may be the start of a second rostrum path.

The determination of extent of similarity may use image matching techniques that match object to object in one image part to an object or objects in a second image part (generally, but not necessarily, this will be between two distinct images). These techniques make allowance for temporal and/or spatial displacement between the two images. One such technique uses active shape models (see Cootes, T. F., Taylor, C. J., Lanitis, A., Multi-resolution Search with Active Shape Models, ICPR Conference 1994 (vol A: pp 610-612)). If a match is found it is preferred for a morphing transition to be used.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extend to any novel one, or any novel combination, of the features disclosed in this specification (including any accompanying claims, abstract and drawings), or to any novel one, or any novel combination, of the steps of any method or process so disclosed.

The invention claimed is:

1. A method of displaying digital images comprising the the steps of using a processor to determine an extent of similarity between a first image part and a second image part, using the processor to determine a transition type, displaying a first image part from a viewpoint and transitioning to displaying a second image part from a viewpoint using the determined transition type, the second image part being selected at least partly based on a determined extent of similarity between the first image part and the second image part, in which the viewpoint of an image part is moved during the transition, and in which the transition type may be determined from one or more of a dissolve, a wipe, a blind, and a random dissolve.

2. A method of displaying digital images according to claim 1, in which the viewpoint of the second image part is moved after the transition takes place.

3. A method of displaying digital images according to claim 1, in which the determination of an extent of similarity requires a substantial match between an object in a first image part and an object in a second image part before a transition is effected.

4. A method of displaying digital images comprising the steps of using a processor to determine an extent of similarity between a first image part and a second image part, displaying a first image part from a viewpoint and transitioning to displaying a second image part from a viewpoint, the second image part being selected at least partly based on a determined extent of similarity between the first image part and the second image part, in which the viewpoint of an image part is moved during the transition, in which the transition is one or more of a dissolve, a wipe, a blind, a random dissolve and a morphing between images, and in which an extent of similarity is determined between at least three image parts, which image parts are displayed in an order based at least in part on maximising the extent of similarity therebetween.

5. A method of displaying digital images according to claim 1, in which a predetermined first image part is selected against which to determine an extent of similarity of a second image part.

6. A method of displaying digital images according to claim 5, in which the predetermined first image part is the final image part of a rostrum path.

7. A method of displaying digital images according to claim 1, in which the determination of the extent of similarity uses image matching.

8. A method of displaying digital images according to claim 1, in which a viewpoint is positioned to maximise the overlap between the first image part and the second image part.

9. A method of displaying digital images according to claim 1, in which there are faces in the first and second image parts and an extent of similarity is determined between faces in the first and second image parts.

10. A method of displaying digital images according to claim 1, in which the first image part and the second image part each have a corresponding frame size and the respective frame size is determined to maximise the overlap between an object in the first image part and an object in the second image part.

11. A method of displaying digital images according to claim 1, in which the first image part and second image part are from the same image.

12. A method of displaying digital images according to claim 1, in which the first image part is from a first image and the second image part is from a second image.

13. A method of displaying digital images according to claim 12, in which a rostrum path is determined in the first image having a first image part start and first image part finish.

14. A method of displaying digital images according to claim 13, in which the first image part is the first image part finish.

15. A method of displaying digital images according to claim 12, in which a rostrum path is determined in the second image having a second image part start and second image part finish.

16. A method of displaying digital images according to claim 15, in which the second image part is the second image part start.

17. A method of displaying digital images according to claim 16, in which the rostrum path of the first image and the rostrum path of the second image are determined whereby the first image part finish is the most similar image part determined in a comparison of the first image rostrum path and the second image rostrum path and the second image part start is the corresponding most similar image part of the second image.

18. A method of displaying digital images according to claim 12, in which the or each rostrum path is determined using the processor to perform an analysis of image data from the first and second images to identify characteristics of the image content; and generating, in the processor, a set of video data for output to a display, the video data representing displayable motion over the image and being generated in accordance with the image content characteristics.

19. A method of displaying digital images comprising the steps of using a processor to determine an extent of similarity between a first image part and a second image part, displaying a first image part from a viewpoint and transitioning to displaying a second image part from a viewpoint, the second image part being selected at least partly based on a determined extent of similarity between the first image part and the second image part, in which the viewpoint of the second image part is moved after the transition takes place and in which an extent of similarity is determined between at least three image parts, which image parts are displayed in an order based at least in part on maximising the extent of similarity therebetween.

20. A method of displaying digital images according to claim 19, in which the viewpoint of one of the image parts is moved during the transition.

21. A method of displaying digital images according to claim 19, in which the transition is one or more of a dissolve, a wipe, a blind, a random dissolve and a morphing between images.

22. A method of displaying digital images according to claim 19, in which the determination of an extent of similarity requires a substantial match between an object in a first image part and an object in a second image part before a transition is effected.

23. A method of displaying digital images according to claim 19, in which a predetermined first image part is selected against which to determine an extent of similarity of a second image part.

24. A method of displaying digital images according to claim 23, in which the predetermined first image part is the final image part of a rostrum path.

25. A method of displaying digital images according to claim 19, in which the determination of the extent of similarity uses image matching.

26. A method of displaying digital images according to claim 19, in which a viewpoint is positioned to maximise the overlap between the first image part and the second image part.

27. A method of displaying digital images according to claim 19, in which there are faces in the first and second image parts and an extent of similarity is determined between faces in the first and second image parts.

28. A method of displaying digital images according to claim 19, in which the first image part and the second image part each have a corresponding frame size and the respective frame size is determined to maximise the overlap between an object in the first image part and an object in the second image part.

29. A method of displaying digital images according to claim 19, in which the first image part and second image part are from the same image.

30. A method of displaying digital images according to claim 19, in which the first image part is from a first image and the second image part is from a second image.

31. A method of displaying digital images according to claim 30, in which a rostrum path is determined in the first image having a first image part start and first image part finish.

32. A method of displaying digital images according to claim 31, in which the first image part is the first image part finish.

33. A method of displaying digital images according to claim 30, in which a rostrum path is determined in the second image having a second image part start and second image part finish.

34. A method of displaying digital images according to claim 33, in which the second image part is the second image part start.

35. A method of displaying digital images according to claim 34, in which the rostrum path of the first image and the rostrum path of the second image are determined whereby the first image part finish is the most similar image part determined in a comparison of the first image rostrum path and the second image rostrum path and the second image part start is the corresponding most similar image part of the second image.

36. A method of displaying digital images according to claim 30, in which the or each rostrum path is determined using the processor to perform an analysis of image data from the first and second images to identify characteristics of the image content; and generating, in the processor, a set of video data for output to a display, the video data representing displayable motion over the image and being generated in accordance with the image content characteristics.

* * * * *